(12) United States Patent
Callaghan (10) Patent No.: US 7,818,003 B2
(45) Date of Patent: Oct. 19, 2010

(54) COMMUNICATION DEVICE AUTO NEGOTIATE RECONNECT (75) Inventor: David M. Callaghan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 787 days.

(21) Appl. No.: 11/432,845

(22) Filed: May 12, 2006

(65) Prior Publication Data
US 2007/0274488 A1 Nov. 29, 2007

(51) Int. Cl.
H04W 4/00 (2009.01)
H04M 3/42 (2006.01)

(52) U.S. Cl. .................. 455/435.1; 379/201.01

(58) Field of Classification Search .......... 455/436, 455/412.1, 417, 445, 414.1, 564, 427.1, 425, 455/426.1, 515, 73, 551, 421, 405, 501, 509, 455/561, 563, 435.1, 450.1, 466, 433, 404.1, 455/410, 411, 423, 434; 379/201.1, 60, 63, 379/58; 370/335, 331, 342, 320
See application file for complete search history.

(56) References Cited

U.S. PATENT DOCUMENTS

| 5,995,830 | A | 11/1999 | Amin et al. ............... 455/423 |
| 6,343,216 | B1 | 1/2002 | Kim et al. ................. 455/450 |
| 6,633,760 | B1 | 10/2003 | Ham et al. ................ 455/422 |
| 6,907,008 | B1 | 6/2005 | Moskovich et al. ......... 370/241 |
| 6,990,349 | B1 | 1/2006 | Idrissi .................... 455/450 |
| 7,171,226 | B2 * | 1/2007 | Crocker et al. ............ 455/510 |
| 7,233,788 | B2 * | 6/2007 | Kedem .................... 455/414.1 |
| 2002/0090947 | A1 | 7/2002 | Brooks et al. ............. 455/436 |
| 2003/0188195 | A1 | 10/2003 | Abdo et al. ............... 713/201 |
| 2005/0048981 | A1 | 3/2005 | Anupam et al. ............ 455/445 |
| 2005/0070286 | A1 | 3/2005 | Awasthi et al. ............ 455/436 |
| 2005/0277408 | A1 | 12/2005 | Stuckman et al. .......... 455/415 |

FOREIGN PATENT DOCUMENTS

WO  WO 01/95660 A1  12/2001

(Continued)

OTHER PUBLICATIONS

"Call Completion Services Introduction OSA Parlay Organization", Rome Nov. 4, 2003, SoloMio Services, http://www.parlay.org/en/docs/nov2003mm/Showcase_Presentations/Tuesday/06SoloMio.pdf, 33 pages.

(Continued)

Primary Examiner—Melody Mehrpour
(74) Attorney, Agent, or Firm—Woodcock Washburn LLP (57) ABSTRACT The embodiments contemplate a negotiation and reconnection method between two devices for use when an original call connection is dropped. In order to allow a reconnected call to be easily made without multiple calls from each user, a negotiation between the two devices is made during the original call, assigning reconnection authority to one of the devices. If the original call is inadvertently dropped, due to for example environmental conditions, the assigned device initiates reconnection by bypassing voicemail options that are typically encountered in a reconnection situation. The reconnection may be used when each of the two devices is attempting to reconnect. Alternatively, if the device that lost coverage is without coverage for an extended period of time, a message may be sent to the other device to inform the user of that device of the situation.

20 Claims, 5 Drawing Sheets

FOREIGN PATENT DOCUMENTS

WO    WO 02/100050 A!    12/2002

OTHER PUBLICATIONS

Sargent, J., "How Presence and Availability Management Help Smaller Cellular Companies Compete", *Planet PDA Magazine: Handheld Productivity Solutions for the Enterprise*, 2003, http://www.planetpdamag.com/content/031203gl.htm, 6 pages.

Cohn, M., "Communication Services", *Internet World Magazine: Inter World*, 2002, 5 pages.

\* cited by examiner

COMMUNICATION DEVICE AUTO NEGOTIATE RECONNECT

BACKGROUND OF THE INVENTION

During a mobile phone conversation between two users each operating mobile telephonic devices, such as smart phones, the phone conversation may often inadvertently end due to circumstances beyond the control of either user. One user may for example lose a network signal when briefly entering an area that does not have adequate network coverage due to environmental conditions, or they may experience dropped calls due to technical issues and glitches. When the user regains the network signal, both users may be attempting to reconnect at the same time. The result may be that both users are directed to the voicemail of the user of which they are attempting to reach. If one user is first directed to the other user's voicemail, the user may be leaving a message at the time an incoming call from the other user is received. The user leaving the message may then complete the message, which is unnecessary as the user must then wait for the other user to retrieve the message, listen to the message, and attempt the reconnection with the user. At the same time, the other user may have left a voicemail message for the user. Alternately to completing the voicemail message, the user leaving the message may suspend the message by answering the incoming call from the other user. This results in several inefficiencies: the network and device are supporting two calls, the user's phone minutes are being expended as two lines of the user's mobile device are currently in use as the voicemail message was not completed at the time the user switched to the second line to answer the incoming call, and often a useless voice message is left which the user(s) must then expend additional phone minutes to listen to and delete.

Furthermore, the disconnection and subsequent reconnection period clearly create an uncomfortable inconvenience as each user waits for the other to return the call or as both users attempt reconnection at the same time. Aware of the common difficulty in reconnecting after a call has been dropped, each user may even decide to wait for the other user to initiate the reconnection. Thus there is a clear need for a device feature that automatically selects one mobile device to initiate the reconnection, which would eliminate the act of both users struggling to reconnect and resume their initial conversation.

SUMMARY OF THE INVENTION

A negotiation method is implemented between two devices during an original call connection in order to assign responsibility to one of the two devices for reconnecting the call if the call is inadvertently dropped due to environmental or unexpected conditions. The negotiation method includes a device either accepting an offer from the other device or making the offer to the other device. Alternatively, if no device makes the offer to be responsible for the reconnection or if the devices cannot reach an agreement, predetermined rules may be consulted for making the assignment. The reconnect negotiation method may include the device(s) interacting with a network resource to arbitrate the reconnection scheme.

In the event of a dropped call and upon determination that both of the two devices are attempting to reconnect, the call is reconnected by the device that is assigned responsibility for the reconnection during the negotiation method. In the event of extended call interruptions caused by such conditions such as an exhausted battery charge or a phone leaving the service area for extended periods, the reconnect algorithm can include provisions based upon a predetermined period of time. Instead of a reconnection, a message such as a text message containing a timestamp and an explanation that the call was interrupted by circumstances beyond the control of the either party may be sent from the device that caused the loss in the original connection to the other device. When this message is received, the timestamp when sent compared to the time which the message was received can serve as an indication that the device causing the loss in the original connection was unavailable but is now ready to reconnect. The reconnection algorithm can use this notification to display a sense of remote user availability as well as to initiate the call or offer to resume the interrupted call. The reconnect client algorithm also includes provisions which can be configured to detect when an incoming call phone number is the same phone number as the current connection and immediately swap or drop the current call.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description are better understood when read in conjunction with the appended drawings. Exemplary embodiments are shown in the drawings, however it is understood that the embodiments are not limited to the specific methods and instrumentalities depicted therein. In the drawings.

DETAILED DESCRIPTION OF ILLUSTRATIVE EMBODIMENTS

Computer Environment

Figure 1:
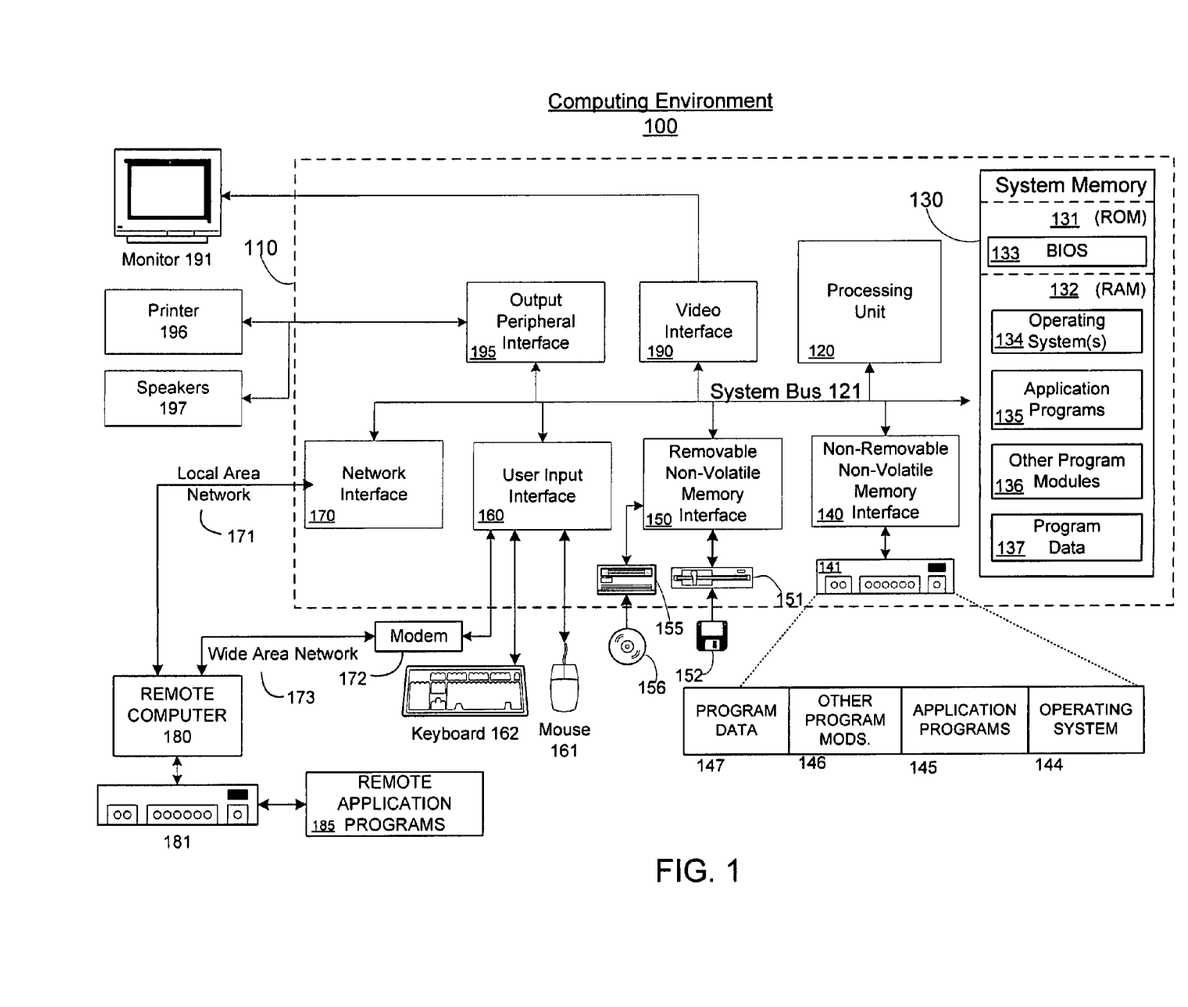
FIG. 1 is a block diagram representing an exemplary computing device in which the present invention may be implemented.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as an interface 140, and the magnetic disk drive 151 and the optical disk drive 155 are typically connected to the system bus 121 by a removable memory interface, such as an interface 150.

The drives and their associated computer storage media, discussed above and illustrated in FIG. 1, provide storage of computer readable instructions, data structures, components, program modules and other data for the computer 110. In FIG. 1, for example, the hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and a pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

All or portions of the methods of the present invention described above may be embodied in hardware, software, or a combination of both. When embodied in software, the methods of the present invention, or certain aspects or portions thereof, may be embodied in the form of program code that when executed by a computing system causes the computing system to perform the methods of the present invention. This program code may be stored on any computer-readable medium, as that term is defined above.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Handheld Computing Device

Figure 2:
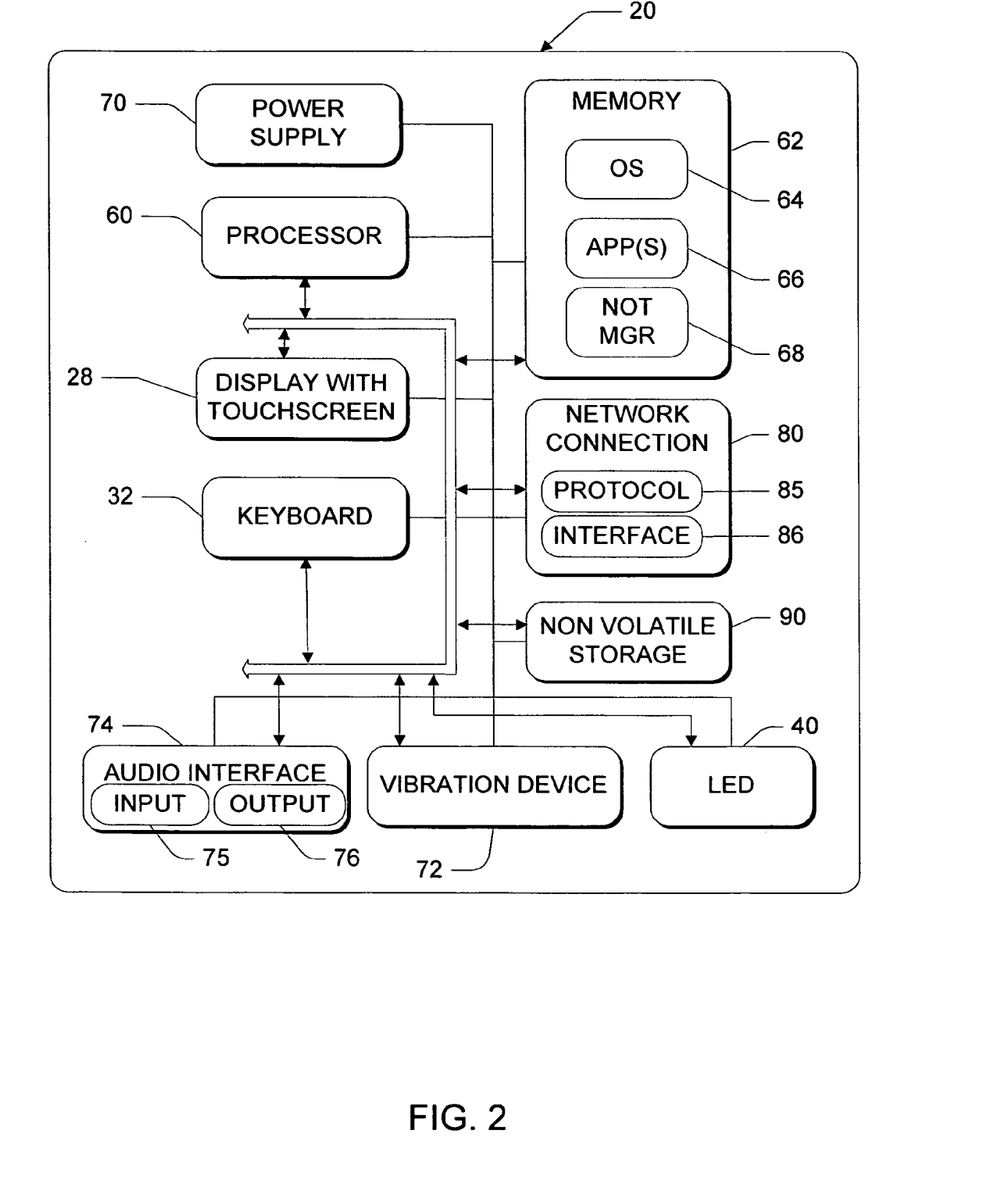
FIG. 2 is a block diagram representing an exemplary handheld computing device in which the present invention may be implemented.

FIG. 2 shows functional components of a handheld computing device 20. It has a processor 60, a memory 62, non-volatile storage 90, a display 28, a keyboard 32, and network connection 80. The memory 62 generally includes both volatile memory (e.g., RAM) and non-volatile memory (e.g., ROM, PCMCIA SD cards, SIM etc.). An operating system 64 is resident in the memory 62 and executes on the processor 60. The handheld computing device 20 includes an operating system, such as the Windows® CE or Windows® Mobile operating system from Microsoft Corporation or other operating system.

One or more application programs 66 are loaded into the memory 62 and executed by the operating system 64. Examples of the application programs 66 include email programs, scheduling programs, PIM (personal information management) programs, word processing programs, spreadsheet programs, Internet browser programs, contact information list management application, mobile phone application to send and receive information such as voice and/or video communications between the device and a network, phone dialing application, and so forth. These applications and respective data are stored in the non-volatile storage component 90 as well as loaded into memory 62 as needed by application 66. The non-volatile storage component 90 can be implemented by a single or plethora of storage devices and technologies including micro disk drives, ROM (Read Only Memory), NAND or NOR based FLASH memory, MRAM (Magnetic RAM), or battery backed RAM, or SIM (Subscriber Identity Module), USIM, or MegaSIM. The handheld computing device 20 also has a notification manager 68 loaded in memory 62, which executes on the processor 60. The notification manager 68 handles notification requests from the applications 66.

The handheld computing device 20 has a power supply 70, which is implemented as one or more batteries. The power supply 70 might further include an external power source that overrides or recharges the built-in batteries, such as an AC adapter or a powered docking cradle.

The handheld computing device 20 is also shown with three types of external notification mechanisms: an LED 40, a vibration device 72, and an audio interface component 74. The audio interface component 74 contains sub components for audio input and output shown by components 75 and 76, respectively. The audio input component 75 can include a microphone with noise cancellation capabilities. The audio output component 76 may include an audio generator which can alert the user with a loud ring tone, support speakerphone modes of operation or play audio which can be heard from a measurable distance from the device 20. The audio output component 76 may include an audio speaker or telephone earpiece used to listen to voice communications within very close proximity to the device 20. Finally the audio interface component 74 may actually interface with wired headsets using a headphone jack (not shown) or communicate over a network such as a Bluetooth (IEEE 802.15.1) to a remote headset. These devices may be directly coupled to the power supply 70 so that when activated, they remain on for a duration dictated by the notification mechanism even though the handheld computing device processor and other components might shut down to conserve battery power. The LED 40 preferably remains on indefinitely until the user takes action. The current versions of the vibration device 72 use too much power for today's handheld computing device batteries, and so they are configured to turn off when the rest of the system does or at some finite duration after activation.

The handheld computing device 20 is also shown with a network connection 80. The network connection component 80 communicatively couples the computing device with any variety of networks such as those conforming with the Institute of Electrical and Electronics Engineers (IEEE) network standards but not limited to Ethernet TCP/IP (IEEE 802.3), Wi-Fi family of specifications including 802.11a, 802.11b, 802.11g, 802.11n, Bluetooth (IEEE 802.15.1), and mobile operator networks such as 3G (third generation wireless telephone technologies) such as UMTS (W-CDMA) (Universal Mobile Telecommunications System Wideband Code Division Multiple Access), CDMA2000 (Code Division Multiple Access), TD-SCDMA (Time Division-Synchronous Code Division Multiple Access), Wideband CDMA, and UMTS TDD networks, as well as 2G/2.5G (second generation GSM (TDMA-based), IDEN, IS-136 D-AMPS, IS-95 cdmaOne, and PDC and 4G WiMAX (IEEE 802.16), TD-SCDMA, Flash-OFDM (Fast Low-latency Access with Seamless Handoff Orthogonal frequency-division multiplexing), and UMTS FDD. The respective protocol stacks necessary to implement the desired network interface are shown by component 85 and the network interface circuitry and connectors shown by component 86. It should be appreciated that the network connection 80 can be implemented by a variety of means including application specific integrated circuits (ASIC) as well as combination of components and sub components including but not limited to central processing units (CPU), volatile and non-volatile memory, protocol stacks, and physical layer interface circuitry such as Ethernet PHYs/Transceivers and RF antenna interfaces.

The term call used throughout the subject invention refers to voice telephone calls, video calls, and other means of exchanging information between two end points typically, but not limited to just two devices (i.e. 3-way calling, peer to peer networking). The devices are not limited to a single audio connection to exchange information but may open multiple communication channels through various network connections to facilitate implementation of the subject invention, such as utilizing primarily a 2G, 2.5G, 3G, or 4G (second, two and a half, third or fourth generation) Mobile Operator network for voice communications such as GSM and a reconnect negotiation using SMS messaging or IEEE 802.11 WiFi connection if available.

Auto-Negotiate Reconnect

Two users, User A and User B for example, may communicate through a call connection with each other on mobile devices, such as the handheld computing device 20 which may be for example a smart phone or a pocket PC. Unfortunately, it is not uncommon for the call connection between the two users to be lost and at no fault of either user. In order to resume the call, the users may each attempt to reconnect with the other user shortly after the call connection is lost. If both users are attempting a simultaneous or near simultaneous reconnection, certain difficulties may ensue. For example, User A may be directed to the voicemail of User B and may be in the process of leaving a voicemail message to User B. At the same time as User A is leaving the voicemail message, User A may receive an incoming call notification indicating that User B is attempting to reach User A. User A may then complete the voicemail message and then attempt to reconnect with User B, or User A may suspend the voicemail message and answer the new incoming call from User B. Both options produce unfavorable outcomes as the first results in an unnecessary message and wasted time as User A completes the message and then again attempts a reconnection with User B, and the second option, while succeeding in reconnecting User A and User B, results in occupying two lines of the device 20 of User A.

An auto-negotiate reconnection option is desirable for the two users, User A and User B for example, communicating with each other on mobile devices such as the device 20. The auto-negotiate reconnect feature is advantageous for situations in which the call connection between User A and User B is lost due to extraneous circumstances, such as entering a geographical region that has minimal or perhaps even no mobile phone network coverage. In such a situation where the call connection is lost and the auto-negotiate feature has been implemented, the reconnection between User A and User B occurs by providing reconnection authority to one of the two devices through an automatic negotiation procedure. The device assigned to reconnection authority then, in the event of an inadvertent connection loss, operates to reconnect the devices by bypassing a voicemail option. The auto-negotiate reconnection feature may include policy considerations for determining the device to be granted the reconnection authority. Furthermore, the users, such as User A and User B, may create settings for using the auto-negotiate reconnect feature when setting up their contact lists. The user-defined settings may for example place limitations depending upon users, time, and location.

Figure 3:
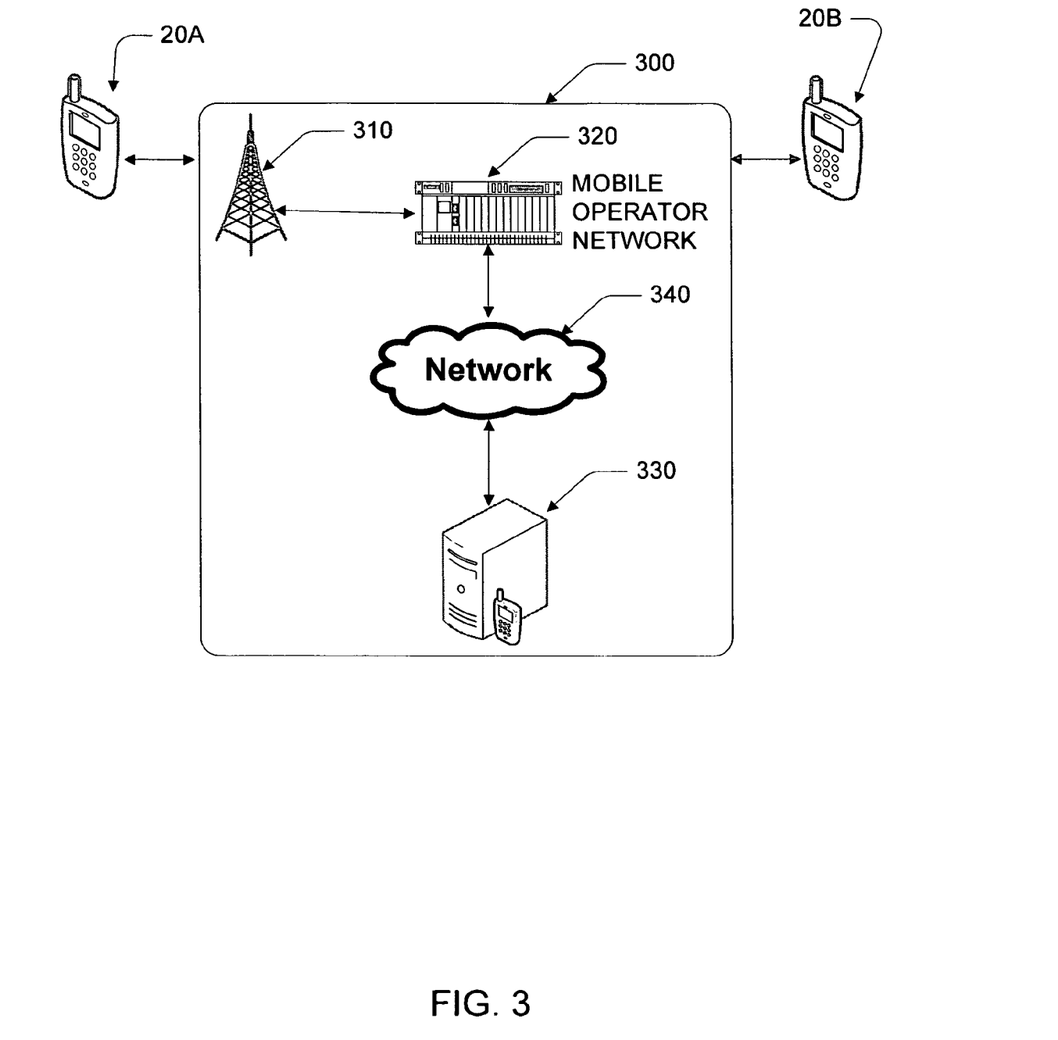
FIG. 3 is a block diagram representing exemplary computing devices communicating over a network in accordance with the subject invention.

FIG. 3 shows functional components of two computing devices, shown as 20A and 20B respectively, communicating over a network represented by component 300. The computing devices 20A and 20B may be either handheld computing devices such as a Windows® Mobile Smartphone or a PC or other computing platform similar to component 100 running the necessary application to exchange information such as voice, video, and other information. Examples of such client applications can include voice over IP (VOIP) applications or standard mobile phone applications used to communicate over for example 2G or 3G networks provided by mobile operators. The network component 300 represents both wired and wireless networks, including mesh networking, client and server, and peer to peer networking. The network component 300 also represents traditional mobile operator networks, such as 2G and 3G (CDMA, GSM, UMTS), and internet networks, such as Ethernet TCP/IP ( Institute of Electrical and Electronics Engineers (IEEE) 802.3), WiFi (IEEE 802.11), WiMax (IEEE 802.16), and Bluetooth (IEEE 802.15.1). Component 330 represents a network store containing the contact list or reconnect preferences of the respective callers as well as applications that may facilitate reconnection between devices 20A and 20B. The server component 330 may interact with the devices 20A/20B directly or it may facilitate their reconnection by interfacing with a network layer component 340 or the Mobile Operator network component 320, or a combination thereof. The communications between these systems may utilize reliable messages, SMS messages, web services, and data packets to assist in the reconnection of the devices' communication. The server represented by component 330 also may contain a reliable message broker such as a MSMQ, MQ, Java Messaging (JMS), or web services interfaces including implementations of WS-Reliable Messaging in addition to the ability to send SMS text messages and email notifications. Further, the component 330 is shown as a single device but may in actuality be implemented by a series of virtual servers, a cluster of servers, or a distributed network. The network layer 300 may interface with a network server or data store 330 or the handset 20A or 20B to determine the reconnect preferences or actions desired by the users of the device 20A and 20B. The mobile devices typically connect to a mobile operator using a wireless network interface shown as component 310 and the individual Mobile Operator network shown as component 320. The Mobile Operator network 320 may interface with a more generic network such as the Internet, their private backbone, or may interface with other roaming networks, represented by component 340, to deliver information to the device 20B. It should be appreciated that devices 20A and 20B do not necessarily have to interface with all the of the components represented in the network component 300. One aspect of the subject invention is determining when the communication between devices 20A and 20B is disrupted by interference or an inability to connect with component 310. The mobile operator equipment 320 carrying the voice communications may detect this loss of connectivity and notify an alternative network device of the lost call and the fact that the call was lost not due to the device 20A ending the call intentionally. Therefore the devices may initiate the reconnect scheme.

It should be appreciated the subject invention is not limited to a specific device 20, network protocol, or interface implementation in component 300. It should be appreciated that the subject invention describes the reconnect application with any of the following scenarios: (1) negotiation between two devices 20A and 20B; (2) negotiation between the device 20A or 20B and the network layer components 320; or (3) negotiation between the devices 20A and 20B and a central or a distributed server 330.

In the first case, the reconnection negotiation can be initiated between the two devices 20A and 20B by the phone applications exchanging inband audio messages as the call is established or when the call ends. Similar to the "chirp sounds" used by push to talk applications, the in-band audio messages may be momentary audible tones, which the device may filter in order to prevent the users from hearing, and may be exchanged when the call is established. For example, if the caller sends a brief chirp above 1500 Hz (i.e. 2000 Hz) this may serve as an indication the caller will redial, or in the other case if the caller sends a lower tone below 1500 Hz (i.e. 500 Hz), this may serve as an indication as a request for the party receiving the call to initiate the redial. The device may acknowledge the request with a second chirp matching the original request or conflict and continue the negotiation with tones or messages until both endpoints reconnect algorithms are satisfied. In a simple case with legacy devices, users can be trained to hear the chirp tone and know if they or the other party should manually initiate the call.

Further the devices can use side-band communications such as SMS text messages whose payload is used to negotiate reconnection in the event the call is dropped. The text message scenario may include a device sending a text message to the other phone with a payload requesting the other phone recall or offer to initiate the reconnect. The two phones can see that a call is being placed or is currently in process or is established with the same number, and therefore examine this text message payload and respond with optional confirmation. In the text message example the payload can include but is not limited to exchanging the messages in either plain text or encrypted. The sender and receiver in this can automatically intercept these messages and delete them so they do not litter the in/out message mailboxes or can remain and serve as a manual indication of which legacy devices should initiate the redial. Examples of payload include a transaction identification "id" (or Globally Unique ID (GUID)) to match request and responses, a request command "cmd" in which cmd equal to "1" means sender wants to initiate reconnect, whereas cmd "2" means sender asks receiver to initiate reconnect. Below is a sample reconnect negotiation text message with XML payload:

Device A sends reconnect offer text message such as:
<connect id="123" cmd="1"/>
Device B processes Device A message (above) and optionally responds:
<connect id="123" cmd="2"/>

Further yet, the devices themselves can obtain IPv4 or IPv6 addresses, for example, and exchange UDP or TCP messages including reliable messaging protocols (JMS (Java Messaging System), MQ, WS-Reliable Messaging or MSMQ) to negotiate the auto reconnect. In the second case, the devices may receive messages from the network layer, such that if device 20A leaves an area of coverage, the device 20B will receive a message and reinitiate the call when the device 20A is connected to the network again.

In the second case, the devices 20A and 20B may receive information from the network indicating the call has been disrupted. For example if device 20A is using voice over internet protocol (VoIP) to communicate with device 20B, a network router in component 340 may send Internet Control Message Protocol (ICMP) packets to device 20A notifying of network congestion resulting in a dropped call. In another example device 20A is using a TCP/IP connection to monitor attachments with the network while sending the communications with UDP packets. The network stack TCP Keep Alive timeout or physical layer can notify the voice communication application that the network is unavailable and initiate the reconnect algorithm. Furthermore the communications between devices 20A and 20B can utilize a combination of VoIP connection between 20B and the network 340, which then connects through the Mobile Operator network component 320 eventually to device 20A. The mobile operator network component 320 can detect a loss of the network connection with device 20B and send a notification to device 20A utilizing a plurality of means, such as a call status information packet via the 3G network itself, or utilizing a side band communication through a text message or device management message.

In the third case the devices 20A and 20B can exchange call status messages with a common network server component 330. The network server can participate in the determination of which device should initiate the reconnection. Further it should be appreciated that the mobile operator network may communicate with the server component 330 on behalf of one or both of the devices 20A or 20B to determine a reconnection policy, and, if so determined, it may immediately reestablish the communication. This may be the expected scenario when offering callers the automatic reconnection capability with their legacy devices which do not have the reconnection client application integrated into the device. The messages between the device 20A and 20B or the network component 320 or 340 with the central server 330 can be of many types, such as chirp tones, text messages (similar to those described in further detail above), TCP or UDP packets, or web services, reliable messages such as MQ, JMS, or MSMQ containing the necessary information. The central server or servers can include message broker middleware interfacing with applications to facilitate the reconnect processing plan. Further it should be appreciated that the devices may securely log into the central server using access credentials or with a federated security model provided by the mobile operator network 320.

It should be appreciated that the subject invention can be implemented by leveraging the optimal communication and network interface components available as necessary to facilitate the reconnection. For example in the event two devices are communicating via Wi-Fi, using a VOIP (voice over IP) communications, and the Wi-Fi hotspot goes down at one end, the devices can send a CDMA message to reconnect. The phone application will detect the incoming call is from the same contact, and drop the lost connection and initiate the 3G based connection automatically.

Figure 4:
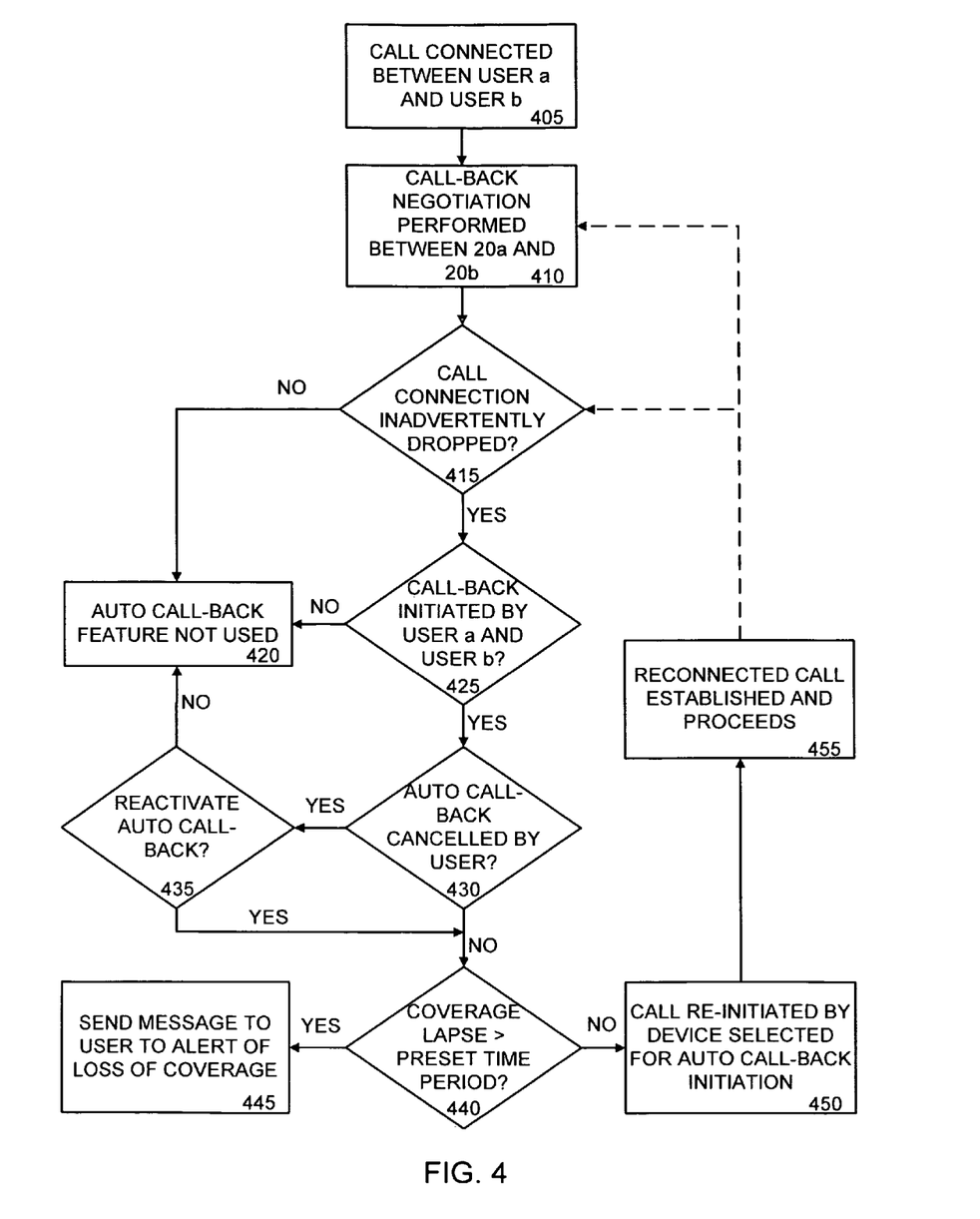
FIG. 4 is a flow diagram illustrating an auto-negotiation phone call method in accordance with one embodiment of the present invention.

FIG. 4 is a flowchart illustrating an exemplary auto-negotiation phone call method. At 405 User A and User B are connected in a call. Either User A or User B may initiate the call. After the call connection is completed, at 410, the auto-negotiation for a possible reconnection is performed between the mobile devices of User A and User B, such as device 20A and device 20B, respectively. The auto-negotiate reconnection is described in more detail with respect to FIG. 5 below. At 415, a determination is made to ascertain if the call connection is inadvertently dropped. This determination may be made by the processor 60A or 60B of the handheld computing devices 20A or 20B. The determination may also be made using information provided by the networks infrastructure carrying the conversation to device 20A or the device 20B. If the call connection is purposefully dropped by one of the users, for example if User A deliberately ends a call with User B by pressing the appropriate end key on the keyboard 32 of the device 20A, then it is determined at 415 that the dropped connection is not inadvertent, and the auto-negotiation reconnect method proceeds to 420. At 420, the auto-negotiate reconnect feature is not used, and a call reconnection is not initiated by either the handheld computing device 20A or 20B. When the user selects to end the call, the devices 20A and 20B may communicate with a central server component 330 indicating the end call key is pressed on the respective handset, or the devices 20A and 20B may communicate with each other using a plurality of means including but not limited to text messages, SMS messages, TCP or UPD data packets, invoking a web service and in-band audio tones. This will as notification to the auto reconnect application that the call was purposefully ended and that reconnection is not desired.

Alternatively, at 415 it may be determined that the call is inadvertently dropped due to the geography surrounding either or both User A and User B or a brief lapse in coverage, for example. Other circumstances may contribute to a call being inadvertently dropped. In such a situation where the call connection is inadvertently dropped, the auto-negotiation reconnect method proceeds to 425. At 425, a subsequent determination is made in order to establish if both User A and User B are attempting to reconnect the original call. If both users are not attempting to reconnect at the same time, the method proceeds to 420, where the call may proceed as directed by the Users A and B but does not incorporate the auto-negotiate reconnect feature.

After establishing at 425 that User A and User B are each initiating a call-back after the inadvertent loss of a call between the two Users A and B, the device 20A, the device 20B, and/or a network of the device 20A or the device 20B may determine whether one of the Users A or B cancels the auto-negotiate reconnect feature from performing the reconnection via the previously-determined negotiation feature. The display 28 of the device 20 may indicate to each User A and B that the reconnection feature is being or will be implemented. Further the display 28 may provide instructions for canceling the operation of this feature if so desired by the User A and B. The instructions may include the depression of a key on the keyboard 32 of the device 20, for example. Or the cancellation instructions may include speaking a word or phrase into a microphone of the device 20. If it is determined, by for example one of the processors 60 of one of the devices 20, that one or both of the Users A and B have cancelled the auto-negotiate reconnection feature, then the method proceeds from 430 to 435. At 435, a subsequent analysis is performed in order to determine if the auto-negotiate reconnection feature is being reactivated by either or both User A or User B. After canceling the operation of the auto-negotiate reconnection feature, User A or User B may decide that the feature is desired to be used after all and may be provided with an opportunity to reactivate the auto-negotiate reconnect feature. The display 28 of the device 20 may provide instructions to be followed by the User A and/or B for reactivating the feature. The instructions may include an indication that the depression of a particular key on the keyboard 32 of the device 20 or the speaking of a particular word or phrase into the microphone of the device 20 will operate to reactive the auto-negotiate reconnection feature. If neither User A nor User B act to reactive the feature, then at 420 the auto-negotiate reconnect feature is not implemented. The Users A and B may continue with the reconnection as desired by the Users A and B but without the aid of the auto-negotiate reconnect feature. If the user or users that canceled the use of the auto-negotiate reconnect feature still does not desire to use the feature, the method proceeds to 420.

After 430 if the reconnection feature has not been canceled by either User A or User B, or after 435 if User A or User B have decided to reactive the feature after the previous cancellation at 430, the auto-negotiate reconnect method proceeds to 440. At 440, the lapse in coverage time resulting in the dropped call is compared to a predetermined time period. If the coverage lapse is greater than the predetermined time period, at 445, a message is sent to the user who did not lose coverage to alert that particular user that the other user lost coverage. The message may serve as an indication that the user who lost coverage is now in an area with steady coverage. The predetermined time period may be any amount of time and may be set by the user or the network of the user's device 20. If for example the lapse in coverage is relatively short, such as less than 5 minutes, the user who lost coverage may not want a message to be sent but may instead desire an actual reconnection with the other user. The message may be a text message, an SMS message, an instant message, or any other type of message that may be received by the handheld computing device 20 utilizing the network connection 80 and processed by the processor 60 of the device 20.

At 450, if it is established that the loss in coverage has not exceeded a predetermined time period, the reconnection call is initiated by the device that at 410 is granted to be the reconnection authority. At 455, the reconnected call may then proceed as desired by both User A and User B. The reconnected call may end through actions dictated by either or both User A and User B, or again the call may be inadvertently disconnected. If at 415 it is established that the call inadvertently ended, the reconnection method may proceed as described above. Alternatively, after the reconnected call is established at 455, the method may proceed to 410 in order to perform a subsequent auto-negotiation in order to determine the device 20 that will initiate reconnection in the event of an additional inadvertent dropped call. This allows for the possibility that although the device 20A was initially responsible for the reconnection, in the event of a dropped call, the device 20A is not necessarily assigned as the reconnection authority for a subsequently reconnected call.

Figure 5:
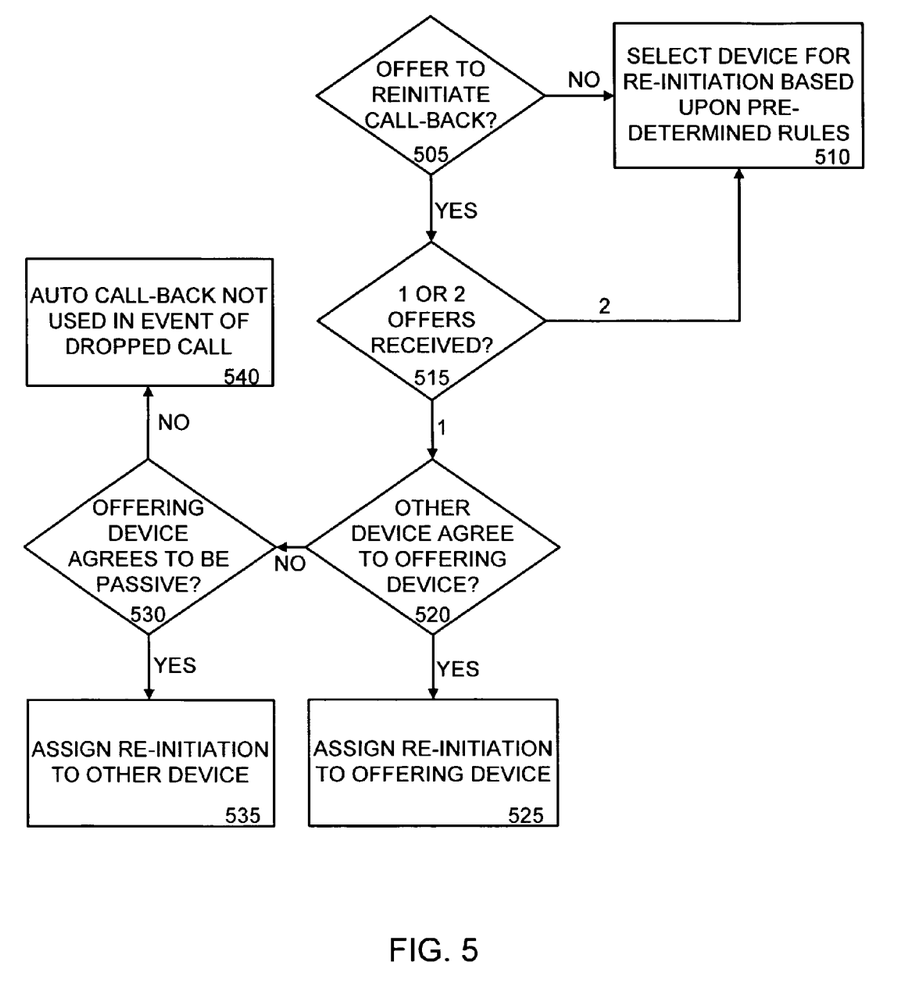
FIG. 5 is a flow diagram illustrating an auto-negotiation method in accordance with one embodiment of the present invention.

The auto-negotiation for a possible reconnection in the event that a call is inadvertently dropped is described with reference to FIG. 5. At 505, a determination is made to establish if either device, such as the handheld computing device 20A and 20B with respective Users A and B, participating in the call has offered to be the reconnection authority. The reconnection authority is the device 20 that, upon a dropped call and when coverage is steadily regained, completes reconnection of the call between the devices 20A and 20B by determining that both of the devices 20A and 20B are attempting to reconnect and by bypassing the voicemail options of both of the devices 20A and 20B. The offer to act as the reconnection authority may include a tone, such as an in-band tone, or a text message sent from one device 20 (the offering device) to the other device 20. Further the devices may negotiate the reconnection authority through interactions with a network service provided by a server setup for this purpose as shown earlier by component 330 in FIG. 3. The devices 20A and 20B may discover each other's IP address on a TCP/IP network and exchange UPD or TCP data packets which contain reconnection authority negotiations. Other offering mechanisms are possible, and the invention is not limited to any one particular offer.

At 510, if at 505 neither device 20A nor 20B has offered to be responsible for the call reconnection, then a predetermined set of rules is consulted by the network in order to select the device 20 for reconnection authority. Alternatively, one or both of the devices 20A and 20B may operate to select the device 20 that will be responsible for the reconnection. Various rules may be created and implemented. The rules may be created by a user of the device 20 or by the network of the device 20 or by a combination of the user and the network. Possible rules for selecting the reconnection authority may include but are not limited to the following:

Select the device that initiates the original call;
Select the device that receives the original call;
Select the device that is associated with a higher phone number;
Select the device that is associated with a lower phone number;
Select the device that loses the signal that results in the dropped call;
Select the device that has a stronger cellular signal;
Select the device as decided by the users at the onset of the call;
Select the device based upon a randomly generated number;
Select the device based upon information gathered by a network;
Select the device based upon contact rules of the devices;
Select the device based upon examining user configuration preferences stored on the network;
Select the device based upon examining user configuration preferences stored on the device;
Only reconnect with customers of a particular Mobile Operator; and
Only reconnect with customers subscribing to a particular quality of service (QOS) service level agreement (SLA).

A hierarchy of rules may also exist such that if the rule for selecting the reconnection authority does not eliminate one of the devices 20A and 20B, a second rule will be applied. For example, if the rule to select the device 20 requires that the device 20 with the stronger cellular signal be chosen and if both devices 20A and 20B have the same cellular signal, then a second rule may be applied.

A user may specify preferences for the reconnection authority when creating a contact list for the user's device 20. For example, for a particular contact, the user may specify that the contact's device 20 should be responsible for performing the reconnection. Or the user may specify that the user's device 20 should only be responsible for performing the reconnection when an offer is not received from the other device 20. Other rules are possible and may be provided to the network for use in handling the reconnection. The preferences arranged by a user may be overridden at or during a time a call is being connected.

At 515, if it is established at 505 that an offer to initiate the reconnection is made, a subsequent determination is performed in order to determine the number of offers received. This determination may be performed by a network of one or both of the devices 20. If two offers are received, for example one offer from each device 20, then the method proceeds to 510, where the reconnection authority rules are utilized. The utilization of the rules allows for one device 20 to be selected as the responsible party for performing the reconnection. If instead only one device 20 makes the offer to act as the reconnection authority, then at 520 yet another determination is executed. At 520 it is determined if the other device 20, which is the device 20 that did not make the offer to perform the reconnection, agrees to allow the offering device 20 to act as the reconnection authority. If the other device agrees to act as a passive device while the offering device is the active device in a reconnection scenario, than at 525 the assignment is complete. The reconnection may then proceed as described above with respect to FIG. 4.

If instead at 520 it is determined that the other device 20 does not agree to allow the offering device 20 to act as the reconnection authority, then at 530 a determination is made to establish if the offering device 20 that initially offered to act as the reconnection authority will agree to instead allow the other device 20 to act as the reconnection authority and will act as the passive device 20. If such an agreement is not reached by the original offering device 20, then at 540 it is established that the reconnection feature will not be implemented in the event of a dropped call as a decision on the reconnection authority could not be reached. If however at 530 the original offering device does agree to act as the passive device, at 535 the assignment of the other device 20 to the reconnection authority is made.

Finally the subject invention identifies that the typical mobile device 20A and 20B are assigned a globally unique phone number. In the event a call is disrupted, and both users attempt to reconnect simultaneously, the current state of the art causes one or both of the callers to enter the voice mail of the other device. Further the devices are typically equipped with call waiting or the ability to place one call on hold while dialing the second call. The auto reconnect application on the devices 20A and 20B includes provisions to enable the ability to always accept an incoming call from the same phone number currently dialed. This will cover the scenario where a call is dropped by the network with device 20B and the remote party at 20B is attempting to reconnect with device 20A. However device 20A may still thinks it is connected to the remote device 20B and using the subject invention can determine that the incoming call is the same phone number that it is presently connected with, and therefore drop the old call, and accept the new incoming call before the caller is sent to device 20A voicemail. This feature may include optional activity monitoring which notices no voice traffic to help determine which circuit should be dropped, or if a voice message has not been started because caller is listening to the announcement before the tone. The devices 20A and 20B can interact with the network 300 components 320, 330 or 340, each other using audio tones, or to validate which line to drop and which to maintain for the audio/video/data call.

As can be appreciated, the disclosed embodiments may be implemented as a whole or in part in one or more computing systems or devices. FIG. 1 illustrates the functional components of one example of a computing system 100 in which aspects may be embodied or practiced. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, handheld computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. Program code and/or data can be implemented in the form of routines, programs, objects, modules, data structures and the like that perform particular functions.

It is noted that the foregoing examples have been provided for the purpose of explanation and are in no way to be construed as limiting. While the invention has been described with reference to various embodiments, it is understood that the words which have been used herein are words of description and illustration, rather than words of limitation. Further, although the embodiments have been described herein with reference to particular means, materials, and examples, the embodiments are not intended to be limited to the particulars disclosed herein; rather, the embodiments extend to all functionally equivalent structures, methods and uses, such as are within the scope of the appended claims.

What is claimed:

1. A method for automatic reconnection of a phone call between a first device and a second device, the method comprising:

while the phone call is in progress before the phone call is inadvertently dropped, performing an automatic negotiation process using an in-band communication channel to assign a reconnection authority from among the first device and the second device, wherein reconnection authority can be assigned to either device and wherein the device assigned reconnection authority takes responsibility to automatically and actively attempt to re-establish the phone call and the device not assigned reconnection authority agrees during the negotiation to be passive;

when the phone call is inadvertently dropped, attempting, by the device assigned reconnection authority, to re-establish the phone call between the first device and the second device.

2. The method of claim 1, further comprising, upon a determination of a cancellation of an automatic reconnection service by the first device or the second device, causing the reconnection authority not to establish a re-connection between the first device and the second device.

3. The method of claim 1, wherein the negotiation process comprises:

upon at least one offer to initiate automatic reconnection from an offering device to an offeree device:
  if the at least one offer comprises two offers, selecting one of the first device and second device as the reconnection authority based upon at least one pre-determined rule;
  if the at least one offer comprises one offer, if the offeree device agrees to the offer, assigning the offering device as the reconnection authority;
  otherwise, if the offering device agrees to be passive, assigning the offeree device as the reconnection authority.

4. The method of claim 3, wherein the at least one predetermined rule comprises criteria used to determine the reconnection authority.

5. The method of claim 4, wherein the at least one predetermined rule is hierarchically assigned by a network component of at least one of the first device and the second device.

6. The method of claim 4, further comprising, if the offering device does not agree to be passive, not employing an automatic reconnection service.

7. The method of claim 1, wherein the reconnection authority initiates the re-connection only if a coverage lapse parameter does not exceed a predetermined time period.

8. The method of claim 7, wherein if the coverage lapse parameter exceeds the predetermined time period, a message is sent to a non-coverage losing device indicating a loss of coverage of a coverage losing device.

9. A method for automatic reconnection of a phone call between a first device and a second device, the method comprising:
  while the phone call is in progress before the phone call is inadvertently dropped, performing an automatic negotiation process using a side-band communication channel to assign a reconnection authority from among the first device and the second device, wherein reconnection authority can be assigned to either device and wherein the device assigned reconnection authority takes responsibility to automatically and actively attempt to re-establish the phone call and the device not assigned reconnection authority agrees during the negotiation to be passive;
  upon a signal from a mobile network operator component that the phone call is inadvertently dropped, if the first device initiated a first call-back to the second device and the second device initiated a second call-back to the first device and a coverage lapse parameter does not exceed a pre-determined time period, attempting, by the device assigned reconnection authority, to re-establish the phone call between the first device and the second device;
  otherwise, if the coverage lapse parameter does exceed the pre-determined time period, sending a message to a non-coverage losing device.

10. The method of claim 9, wherein the predetermined time period is set by a coverage losing device.

11. The method of claim 9, wherein the signal that the call is advertently dropped comprises a side-band communication.

12. The method of claim 9, wherein the determination that the first device initiated a call-back to the second device and the second device initiated a call-back to the first device comprises a determination that an incoming call is the same as an outgoing call.

13. The method of claim 9, wherein a network server participates in assigning the reconnection authority.

14. The method of claim 9, wherein the negotiation process comprises:
  upon at least one offer to initiate automatic reconnection from an offering device to an offeree device:
    if the at least one offer comprises two offers, selecting one of the first device and second device as the reconnection authority based upon at least one pre-determined rule;
    if the at least one offer comprises one offer, if the offeree device agrees to the offer, assigning the offering device as the reconnection authority;
    otherwise, if the offering device agrees to be passive, assigning the offeree device as the reconnection authority.

15. A handheld computing device comprising:
  a memory;
  a processor;
  a network component to couple the handheld computing device to a network; and
  control code stored in a portion of the memory comprising computer-readable instructions for automatic reconnection of a phone call between a handheld computing device and a second device, comprising:
    while the phone call is in progress before the phone call is inadvertently dropped, performing an automatic negotiation process using an in-band communication channel to assign a reconnection authority from among the handheld computing device and the second device, wherein reconnection authority can be assigned to either device and wherein the device assigned reconnection authority takes responsibility to automatically and actively attempt to re-establish the phone call and the device not assigned reconnection authority agrees during the negotiation to be passive;
    when the phone call is inadvertently dropped, attempting, by the device assigned reconnection authority, to re-establish the phone call between the handheld computing device and the second device.

16. The handheld computing device of claim 15, wherein the handheld computing device is a smart phone.

17. The handheld computing device of claim 15, wherein the handheld computing device is assigned as the reconnection authority if the second device is not a smart phone.

18. The handheld computing device of claim 15, wherein the network component comprises:
  protocol stacks to implement a network interface; and
  network interface circuitry.

19. The handheld computing device of claim 15, wherein the network is at least one of (i) a wired network; and (ii) a wireless network.

20. The handheld computing device of claim 15, wherein the network comprises a network store, and wherein the network interfaces with at least one of (i) the network store and (ii) one of the handheld computing device and the second device to determine the reconnection authority.

* * * * *